US012407940B2

United States Patent
Qiao et al.

(10) Patent No.: US 12,407,940 B2
(45) Date of Patent: Sep. 2, 2025

(54) IMAGE PROCESSING METHOD AND APPARATUS, DEVICE, MEDIUM AND PRODUCT

(71) Applicant: Beijing Zitiao Network Technology Co., Ltd., Beijing (CN)

(72) Inventors: Zhendong Qiao, Beijing (CN); Guidong Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 242 days.

(21) Appl. No.: 18/348,726

(22) Filed: Jul. 7, 2023

(65) Prior Publication Data

US 2024/0031687 A1 Jan. 25, 2024

(30) Foreign Application Priority Data

Jul. 21, 2022 (CN) .......................... 202210864903.9

(51) Int. Cl.
*H04N 23/745* (2023.01)
*H04N 23/741* (2023.01)

(52) U.S. Cl.
CPC ......... *H04N 23/745* (2023.01); *H04N 23/741* (2023.01)

(58) Field of Classification Search
CPC .... H04N 23/745; H04N 23/741; H04N 23/90; H04N 5/265; G06T 5/10; G06T 5/50; G06T 2207/20056; G06T 2207/20221
See application file for complete search history.

(56) References Cited

U.S. PATENT DOCUMENTS

| 7,298,401 | B2 | 11/2007 | Baer |
| 10,939,042 | B1 * | 3/2021 | Dolan .................. H04N 23/741 |
| 11,004,233 | B1 * | 5/2021 | Wang ................... G06V 20/588 |
| 2017/0134634 | A1 * | 5/2017 | Jin .......................... H04N 23/73 |
| 2020/0177789 | A1 * | 6/2020 | Sheinin ............... H04N 25/531 |
| 2021/0104031 | A1 * | 4/2021 | Imagawa ................ G06T 11/00 |
| 2021/0176390 | A1 * | 6/2021 | Okuike .................... H04N 9/77 |
| 2021/0274085 | A1 * | 9/2021 | Sheinin .................. H04N 23/56 |

FOREIGN PATENT DOCUMENTS

| CN | 114513609 A | 5/2022 |
| CN | 114554104 A | 5/2022 |

* cited by examiner

*Primary Examiner* — Sinh Tran
*Assistant Examiner* — Angel L Garces-Rivera
(74) *Attorney, Agent, or Firm* — Astute IP Law Group

(57) ABSTRACT

Embodiments of the present disclosure provide an image processing method and apparatus, a device, a medium and a product. The method is applied to a head-mounted device, where the head-mounted device includes a first camera set to be in a rolling shutter mode and a second camera set to be in a global shutter mode, and the method includes: obtaining a first image acquired by the first camera and a second image acquired by the second camera; obtaining target gain information between the second image and the first image by performing image difference analysis on the first image and the second image; obtaining a target frequency domain image by using the target gain information to repair the first image in a frequency domain; obtaining a target image corresponding to the first image by converting the target frequency domain image from the frequency domain to a time domain.

20 Claims, 4 Drawing Sheets

IMAGE PROCESSING METHOD AND APPARATUS, DEVICE, MEDIUM AND PRODUCT

CROSS-REFERENCE TO RELATED APPLICATION

This application claims priority to Chinese Patent Application No. 202210864903.9, filed on Jul. 21, 2022, which is hereby incorporated by reference in its entirety.

TECHNICAL FIELD

Embodiments of the present disclosure relate to the field of electronic technology, and in particular, to an image processing method and apparatus, a device, a medium and a product.

BACKGROUND

With the rapid development of information technology, head-mounted devices, such as VR (Virtual Reality) devices, have increasingly high demand for video display, and have certain requirements for real-time and picture quality of the video display. Generally, in order to ensure the display effect, the head-mounted device can include multiple cameras, such as a RGB (red green blue, three primary colors) camera and several grayscale cameras, so as to acquire images through the RGB camera and several grayscale cameras respectively to effectively perceive the surrounding environment through various images acquired.

However, stroboscopic phenomenon often occurs in videos or images acquired by the RGB cameras. The stroboscopic phenomenon can refer to the problem of brightness flickering in the video picture or image. Darker stripes and brighter stripes appear alternately, resulting in low display efficiency of the head-mounted devices.

SUMMARY

Embodiments of the present disclosure provide an image processing method and apparatus, a device, a medium and a product to overcome the problem of stroboscopic phenomena in video or images acquired by a head-mounted device.

In a first aspect, an embodiment of the present disclosure provides an image processing method, applied to a head-mounted device, where the head-mounted device includes a first camera set to be in a rolling shutter mode and a second camera set to be in a global shutter mode, where the method includes:
  obtaining a first image acquired by the first camera and a second image acquired by the second camera;
  obtaining target gain information between the second image and the first image by performing image difference analysis on the first image and the second image;
  obtaining a target frequency domain image by using the target gain information to repair the first image in a frequency domain;
  obtaining a target image corresponding to the first image by converting the target frequency domain image from the frequency domain to a time domain.

In a second aspect, an embodiment of the present disclosure provides an image processing apparatus, located in a head-mounted device, where the head-mounted device includes a first camera set to be in a rolling shutter mode and a second camera set to be in a global shutter mode, and the apparatus includes:
  an image acquisition unit, configured to obtain a first image acquired by the first camera in the rolling shutter mode and a second image acquired by the second camera in the global shutter mode;
  an information extraction unit, configured to obtain target gain information between the second image and the first image by performing image difference analysis on the first image and the second image;
  an image repair unit, configured to obtain a target frequency domain image by using the target gain information to repair the first image in a frequency domain;
  a target conversion unit, configured to obtain a target image corresponding to the first image by converting the target frequency domain image from the frequency domain to a time domain.

In a third aspect, an embodiment of the present disclosure provides a head-mounted device, including: a processor and a memory;
  the memory stores computer-executed instructions;
  the processor executes the computer-executed instructions stored in the memory to enable the processor to execute the image processing method described above in the first aspect and in various possible designs of the first aspect.

In a fourth aspect, an embodiment of the present disclosure provides a computer readable memory medium in which the computer-executed instructions are stored, and when the processor executes the computer-executed instructions, the image processing method described above in the first aspect and in various possible designs of the first aspect is implemented.

In a fifth aspect, an embodiment of the present disclosure provides a computer program product, including a computer program, when the computer program is executed by a processor, the image processing method described above in the first aspect and in various possible designs of the first aspect is implemented.

The image processing method provided in the embodiment of the present disclosure can be used in a head-mounted device. The head-mounted device may include a first camera set to be in a rolling shutter mode and a second camera set to a global shutter mode to obtain a first image acquired in the rolling shutter mode and a second image acquired in the global shutter mode. The first image is prone to stroboscopic phenomenon, while the second image is not prone to stroboscopic phenomenon due to the acquisition in the global shutter mode. Therefore, target gain information of the second image relative to the first image can be extracted, and the target gain information between the second image and the first image can be obtained by performing image difference analysis on the first image and the second image. The target gain information can represent the frequency domain difference between the first image and the second image. Therefore, the target gain information can be used to repair the first image in the frequency domain to obtain a target frequency domain image, and then obtain a repaired target image by converting the frequency domain to the time domain. By performing frequency domain repair on the first image with stroboscopic phenomenon, the stroboscopic phenomenon of the first image can be enabled to be eliminated and the display efficiency is improved.

BRIEF DESCRIPTION OF DRAWINGS

In order to more clearly illustrate the technical schemes in the embodiments of the present disclosure or in the related art, a brief description of the drawings required to be used in the embodiments or in the description of the related art is presented below. It is obvious that the drawings in the description below are embodiments of the present disclosure. For those of ordinary skill in the art, other drawings can be obtained according to these drawings without any creative effort.

DESCRIPTION OF EMBODIMENTS

Figure 1:
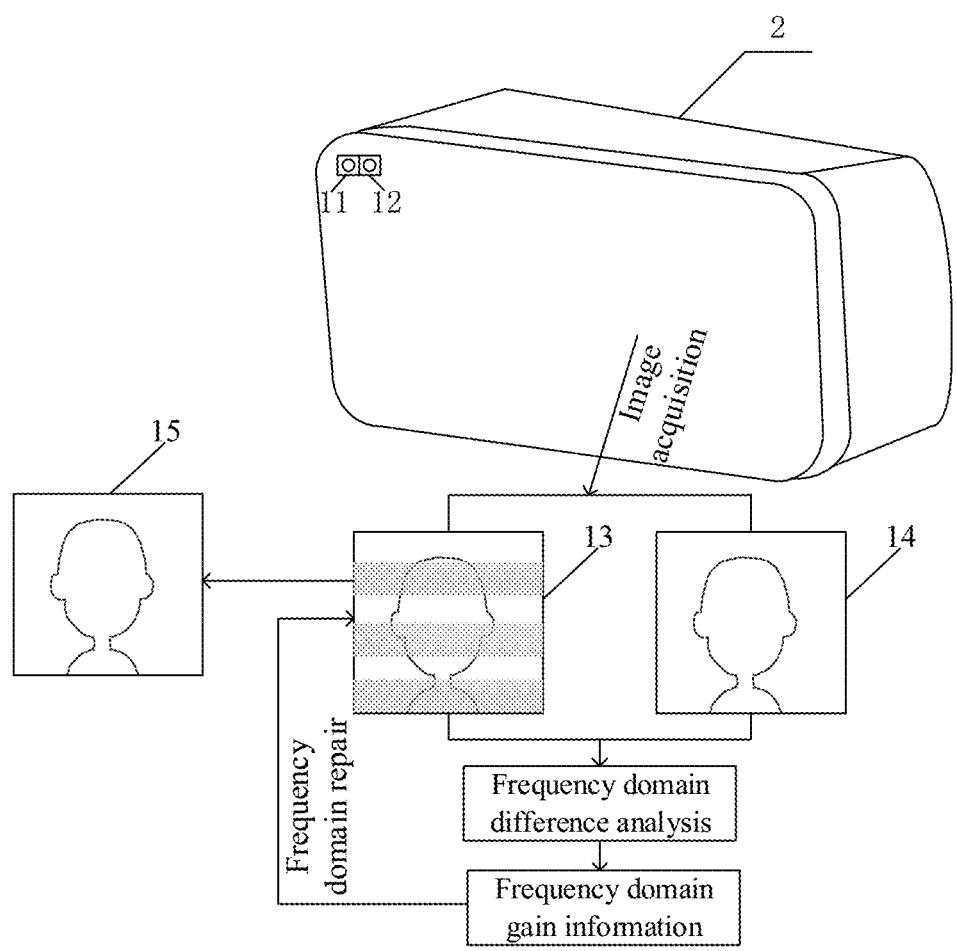
FIG. 1 is an application schematic diagram of an image processing method in one or more embodiments of the present disclosure.

In order to make the purpose, technical scheme and advantages of the embodiments of the present disclosure clearer, the technical scheme in the embodiments of the present disclosure will be clearly and completely described in combination with the drawings of the embodiments of the present disclosure. Obviously, the described embodiment is a part of the embodiments of the present disclosure, rather than all the embodiments. Based on the embodiments of the present disclosure, all other embodiments acquired by those of ordinary skill in the art without creative effort are subject to the protection of the present disclosure.

The technical scheme of the present disclosure can be applied to a head-mounted device, and an image without stroboscopic phenomenon can be used to repair an image with stroboscopic phenomenon from a frequency domain, so as to eliminate the stroboscopic phenomenon of the image and improve the image display effect.

In the related art, the head-mounted device can include two or more cameras, including a RGB camera and a grayscale camera. Videos or images acquired by the grayscale camera generally do not have stroboscopic phenomena, while videos or images acquired by the RGB camera have stroboscopic phenomena, which will affect the display effect of the videos or the images. At present, elimination of stroboscopic phenomenon in the related art is generally achieved by adjusting parameters of the RGB camera. For example, the stroboscopic phenomenon can be eliminated by increasing exposure time and other means. This adjustment method has poor effect.

In order to solve above technical problems, in the technical scheme of the present disclosure, an image processing method is considered to eliminate the stroboscopic images. In practical applications, the rolling shutter mode means that a sensor (also known as a camera) exposes row by row until all pixels are exposed. For videos or images acquired by the camera, there may be flicker, that is, stroboscopic phenomenon, and the output efficiency is not high. The global shutter mode means that all pixels are exposed at the same time. In this mode, no stroboscopic phenomenon occurs. The present disclosure takes into account that the stroboscopic phenomenon is generally caused by instability in the frequency domain. Therefore, the image acquired in the global shutter mode with a stable frequency domain can be used to repair the image acquired in the rolling shutter mode in the frequency domain, so that the image acquired in the rolling shutter mode can enter a stable state in the frequency domain, so as to eliminate the root cause of the stroboscopic phenomenon and improve the image display efficiency.

In the embodiments of the present disclosure, the first image acquired in the rolling shutter mode and the second image acquired in the global shutter mode can be obtained. The first image is prone to stroboscopic phenomenon, while the second image is not prone to stroboscopic phenomenon due to the acquisition in the global shutter mode. Therefore, target gain information of the second image relative to the first image can be extracted, and the target gain information between the second image and the first image can be obtained by performing image difference analysis on the first image and the second image. The target gain information can represent the frequency domain difference between the first image and the second image. Therefore, the target gain information can be used to repair the first image in the frequency domain to obtain a target frequency domain image, and then obtain a repaired target image by converting the frequency domain to the time domain. By performing frequency domain repair on the first image with stroboscopic phenomenon, the stroboscopic phenomenon of the first image can be enabled to be eliminated and the display efficiency is improved.

The following will take specific embodiments to explain the technical scheme of the present disclosure and how the technical scheme of the present disclosure solves the above technical problems in detail. The following specific embodiments may be combined with each other, and the same or similar concepts or processes may not be repeated in some embodiments. The embodiments of the present disclosure are described in detail in combination with the drawings.

FIG. 1 is an application schematic diagram of an image processing method of the present disclosure. The application network architecture of the embodiment of the present disclosure may include a head-mounted device 2, which, for example, may include a VR display screen, smart glasses, etc. The present disclosure does not make too many restrictions on a specific type of the head-mounted device. The head-mounted device may include a first camera 11 set to be in a rolling shutter mode and a second camera 12 set to be in a global shutter mode. The first camera 11 can acquire a first image 13, and the second camera 12 can acquire a second image 14, where the first image 13 may have stroboscopic phenomenon. By analyzing an image difference between the first image 13 and the second image 14, target gain information between the second image 14 and the first image 13 can be obtained, and a target frequency domain image can be obtained by using the target gain information to repair the first image 13 in a frequency domain. The target frequency domain image can be the image after repair. After it is converted from the frequency domain to a time domain, a target image 15 corresponding to the first image 13 can be obtained. With reference to FIG. 1, the target image 15 can be the first image 13 whose the stroboscopic phenomenon is eliminated, and the efficient display of the first image 13 can be realized.

Figure 2:
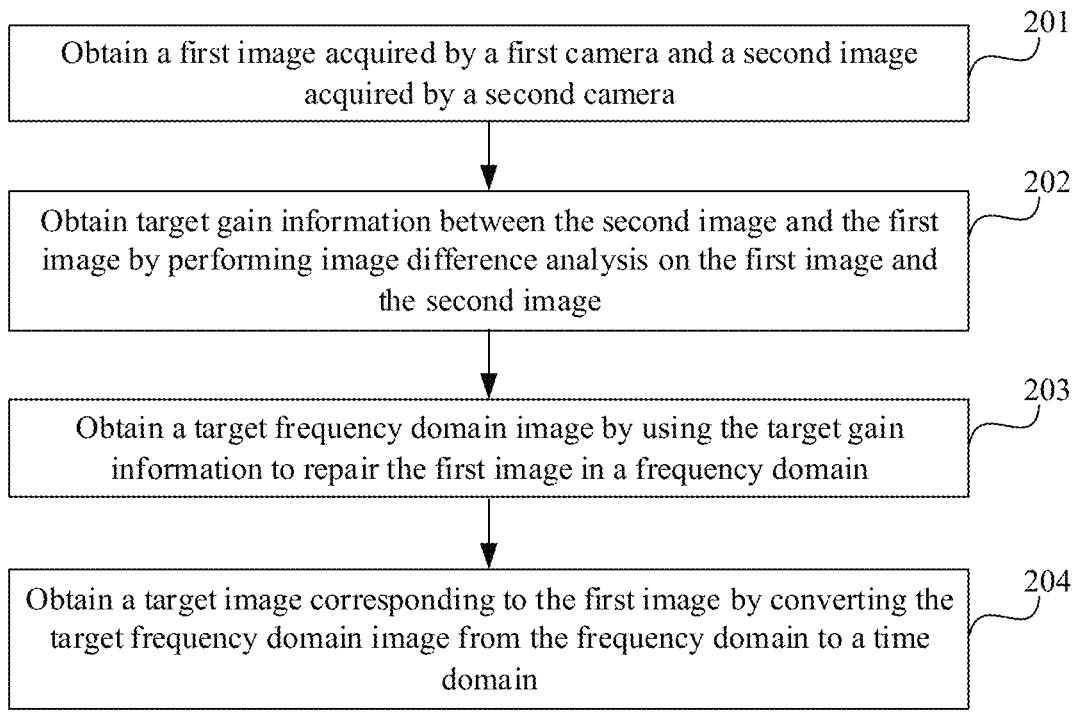
FIG. 2 is an image processing method in one or more embodiments of the present disclosure.

Refer to FIG. 2, which is an image processing method in one or more embodiments of the present disclosure, which may be configured as an image processing apparatus and may be located in a head-mounted device. Among them, the head-mounted device includes a first camera set to be in a rolling shutter mode and a second camera set to be in a global shutter mode. The image processing method can include the following steps.

201: obtain a first image acquired by a first camera and a second image acquired by a second camera.

The first camera can include a RGB camera. The second camera can include a grayscale camera. In practical applications, the first camera can be set to be in a rolling shutter mode. In this mode, the image of the camera can be exposed row by row, starting from the first row and scanning row by row until all pixel points are exposed. The second camera can be set to be in a global shutter mode. In this mode, all pixels acquire light simultaneously and all pixels are exposed simultaneously. The rolling shutter mode is prone to stroboscope because of the use of scanning row by row, while the global shutter mode uses simultaneous exposure and does not have stroboscope.

The first image and the second image can be acquired for the same environment at the same time. Of course, in practical applications, there may be time acquisition differences between the first image and the second image. A time stamp difference between the first image and the second image can be less than the time threshold, which can be as small as possible, for example, 0.1 second or 0.01 second.

The first image can be extracted from the first video acquired by the first camera, and the second image can be extracted from the second video acquired by the second camera. When determining the first image and the second image, the first image and the second image with the same timestamp can be acquired from the first video acquired by the first camera and the second video acquired by the second camera.

202: obtain target gain information between the second image and the first image by performing image difference analysis on the first image and the second image.

The target gain information may include a gain coefficient for the second image to improve the stability of the first image in the frequency domain. Image difference analysis can refer to performing image difference analysis on the first image and the second image.

203: obtain a target frequency domain image by using the target gain information to repair the first image in a frequency domain.

The target frequency domain image can be the image obtained by repairing the first image in the frequency domain.

204: obtain a target image corresponding to the first image by converting the target frequency domain image from the frequency domain to a time domain.

The obtaining the target image corresponding to the first image by converting the target frequency domain image from the frequency domain to the time domain can include: the target image of the first image can be obtained by performing the inverse Fourier transform on the target frequency domain image.

The target image can be obtained by eliminating stroboscopic phenomenon for the first image.

The frequency domain can refer to a coordinate system used to describe characteristics of a signal in terms of frequency. The horizontal axis is the frequency and the vertical axis is the amplitude of the signal at that frequency. The time domain can refer to a first coordinate system used to describe the characteristics of a signal in terms of time. The horizontal axis is time, and the vertical axis is values of the signal at different times.

When the signal is time, the time domain vertical axis can be the pixel value, and the frequency domain vertical axis can be the amplitude of the pixel in the frequency domain. In practical application, it can refer to the ambient brightness of the pixel.

In the embodiments of the present disclosure, the first image acquired in the rolling shutter mode and the second image acquired in the global shutter mode can be obtained. The first image is prone to stroboscopic phenomenon, while the second image is not prone to stroboscopic phenomenon due to the acquisition in the global shutter mode. Therefore, target gain information of the second image relative to the first image can be extracted, and the target gain information between the second image and the first image can be obtained by performing image difference analysis on the first image and the second image. The target gain information can represent the frequency domain difference between the first image and the second image. Therefore, the target gain information can be used to repair the first image in the frequency domain to obtain a target frequency domain image, and then obtain a repaired target image by converting the frequency domain to the time domain. By performing frequency domain repair on the first image with stroboscopic phenomenon, the stroboscopic phenomenon of the first image can be enabled to be eliminated and the display efficiency is improved.

At present, when performing image difference analysis on the first image and the second image, the row gain information corresponding to the difference of the pixel mean of each row can be taken as the target gain information, that is, the target gain information includes: row gain information. Therefore, with reference to FIG. 3, the difference from the one or more embodiments shown in FIG. 2 lies in step 202: obtain target gain information between the second image and the first image by performing image difference analysis on the first image and the second image, which may include the following steps.

301: obtain a first mean value of the first image in each row by calculating a pixel mean value of the first image in each row.

302: obtain a second mean value of the second image in each row by calculating a pixel mean value of the second image in each row.

Among them, the calculation of the pixel mean of each row can include: adding the pixel values of all pixel points in each row to obtain the sum of the pixel values, and dividing the sum of pixel values by the number of pixel points in the row to obtain the pixel mean of the row.

303: obtain a row gain coefficient of the second image in each row relative to the first image by calculating a ratio of the first mean and the second mean of each row starting from a first row.

For any row, the ratio of the first mean and the second mean of the row can be calculated, and this ratio is the row gain coefficient of the row.

The row gain coefficient can be the ratio of the mean value of pixels in the corresponding row between the first image and the second image.

304: determine the row gain information based on the row gain coefficient of the second image in each row relative to the first image.

The row gain coefficients respectively corresponding to the second image in all rows can constitute the row gain information.

In the embodiments of the present disclosure, the pixel mean value of the first image in each row can be calculated to obtain the first mean value of the first image in each row, and the pixel mean value of the second image in each row can be calculated to obtain the second mean value of the second image in each row. The first mean and the second mean of any row are compared to realize the pixel difference analysis of the first image and the second image, obtain the accurate gain coefficient, and realize the accurate extraction of the row gain information.

In one possible design, obtaining the target frequency domain image by using the row gain information to repair the first image in the frequency domain includes:

extracting a first low frequency image of the first image;
obtaining a first frequency result corresponding to the first image by converting the first low frequency image to the frequency domain;
obtaining the target frequency domain image by performing frequency domain gain processing on the first frequency result according to the row gain information.

The obtaining the first frequency result corresponding to the first image by converting the first low frequency image to the frequency domain, which can include: obtaining the first frequency result corresponding to the first image by performing Fourier transform on the first low frequency image.

In the embodiments of the present disclosure, when repairing the first image in the frequency domain, the first low frequency image of the first image can be extracted and converted into the frequency domain to realize the conversion of the first low frequency image from the time domain to the frequency domain, so as to use the row gain information to perform the frequency domain gain processing on the first frequency result, so as to obtain the target frequency domain image, realize the frequency domain enhancement of the first low frequency image, and obtain more stable target frequency domain image.

In order to obtain an accurate target frequency domain image, as a possible implementation, the obtaining the target frequency domain image by performing the frequency domain gain processing on the first frequency result according to the row gain information includes:

determining the row gain coefficient of the second image in each row relative to the first image;
calculating a multiplication result of frequency domain data of the first frequency domain result in a target row and the row gain coefficient corresponding to the target row, and taking the multiplication result as target frequency domain data of the target row; where the target row is obtained by traversing from the first row to a last row of the first frequency domain result;
obtaining the target frequency domain image composed of the target frequency domain data corresponding to the first frequency result in all rows.

It is possible to obtain the rows traversed each time as target rows by traversing from the first row to the last row of the first frequency domain result. The frequency domain data of the first frequency domain result in the target row can be multiplied by the row gain coefficient of the target row, and the result obtained by the multiplication can be used as the target frequency domain data of the target row. The frequency domain data of the target row can be multiplied separately by the corresponding row gain data. The dimensions of the frequency domain data can be equal to the dimensions of each row of the first image.

There are row gain coefficients of the second image and the first image in each row. For example, if the image sizes of the first image and the second image are 128*128, there can be 128 row gain coefficients if there are row gain coefficients in each row. The gain coefficients of all rows can be an ambient brightness matrix, for example, 128 row gain coefficients can form a 128-dimensional ambient brightness matrix.

In the embodiment of the present disclosure, after determining the row gain coefficient of the second image in each row relative to the first image, the multiplication result of the frequency domain data of the first frequency domain result in the target row and the row gain coefficient corresponding to the target row can be calculated, and the multiplication result is taken as the target frequency domain data of the target row, realizing the calculation of the target frequency domain data of the target row. The target row can be obtained by traversing from the first row to the last row of the first frequency domain result, and the repair of the first image can be completed with the dimension of the row, so as to improve the repair efficiency and accuracy of the first image and obtain the accurate target frequency domain image.

In order to realize the extraction of the first low frequency image, as an embodiment, the extracting the first low frequency image of the first image includes:

obtaining the first low frequency image of the first image based on the low pass filtering processing of the first image.

In the embodiment of the present disclosure, the first image is processed by low pass filtering to realize the accurate extraction of the first low frequency image of the first image and improve the extraction efficiency and accuracy of the first image.

Figure 4:
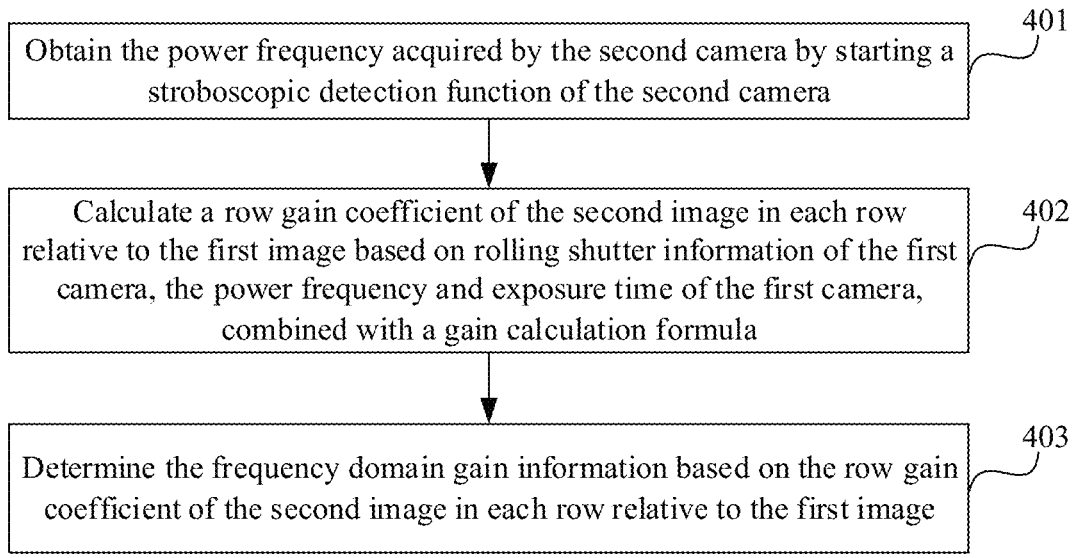
FIG. 4 is an image processing method in one or more embodiments of the present disclosure.

As shown in FIG. 4, the difference from the one or more embodiments shown in FIG. 2 lies in that the target gain information includes: frequency domain gain information.

Step 202: obtain target gain information between the second image and the first image by performing image difference analysis on the first image and the second image, which may include the following steps.

401: obtaining power frequency acquired by the second camera by starting a stroboscopic detection function of the second camera.

After starting the stroboscopic detection function of the second camera, the power frequency transmitted by the second camera can be received.

Optionally, the stroboscopic refers to the fluctuation of the luminous flux of an electric light source at a certain frequency. The unit of stroboscope can be expressed as Hz (Hertz). For example, stroboscope above 80 Hz is not easily detected by human eyes, but it has a great impact on the spatial perception of human eyes. For example, seeing a moving object as a series of still images is known as the stroboscopic effect.

402: calculate a row gain coefficient of the second image in each row relative to the first image based on rolling shutter information of the first camera, the power frequency and exposure time of the first camera, combined with a gain calculation formula.

The gain calculation formula can be expressed as:

$$f(\text{row}) = K * \int_{P0+\frac{k}{f}+row*\Delta t}^{P0+\frac{k}{f}+row*\Delta t+T} (\sin(2*\pi*freq*t))^2 dt$$

where, k is a preset constant, p0 is a phase position of the power waveform when the first row of the first frame starts to expose, f is a video frame rate, freq is a power frequency, k is the number of frames currently shot, row is the number of rows currently exposed, Δt is an exposure time interval of adjacent two rows, and T is an exposure duration.

Rolling shutter information can include other parameters in addition to the power frequency freq and the exposure duration T.

403: determine the frequency domain gain information based on the row gain coefficient of the second image in each row relative to the first image.

In the embodiments of the present disclosure, the power frequency acquired by the second camera can be obtained by starting the stroboscopic detection function of the second camera, so that the row gain coefficient of each row can be accurately calculated based on the rolling shutter information of the first camera, the power frequency and the exposure time of the first camera, combined with the gain calculation formula. The frequency domain gain information between the second image and the first image can be determined based on the row gain coefficient of the second image in each row relative to the first image. By using the gain calculation formula, the row gain coefficient of each row can be calculated accurately, and the calculation efficiency and the accuracy of the gain information in frequency domain can be improved.

As an embodiment, obtaining the target frequency domain image by using the frequency domain gain information to repair the first image in the frequency domain includes:

extracting a second low frequency image of the second image and a third low frequency image of the first image;

obtaining a third frequency result corresponding to the first image and a second frequency result corresponding to the second image by converting both the third low frequency image and the second low frequency image to the frequency domain;

obtaining the target frequency domain image by performing frequency domain fusion processing based on the frequency domain gain information, the third frequency result and the second frequency result.

In the embodiment of the present disclosure, the second low frequency image of the second image and the third low frequency image of the first image can be extracted. By converting both the second low frequency image and the third low frequency image to the frequency domain, the third frequency domain result corresponding to the first image and the second frequency result corresponding to the second image can be obtained. By combining the frequency domain gain information, the third frequency domain result and the second frequency domain result, the target frequency domain image can be obtained by performing frequency domain fusion processing. By means of frequency domain fusion, the target frequency domain image which synthesizes the third frequency domain result and the second frequency domain result can be obtained, and the fusion of frequency domain result of the first image and the second image can be achieved to obtain a more comprehensive and accurate target frequency domain image.

In one possible design, the obtaining the target frequency domain image by performing the frequency domain fusion processing based on the frequency domain gain information, the third frequency result and the second frequency result includes:

obtaining the target frequency domain image by performing frequency domain fusion calculation on the frequency domain gain information, the third frequency result and the second frequency result according to a frequency domain fusion formula.

The frequency domain fusion formula can be expressed as:

$$F_{res}=\Sigma(f_{res}^{(i)})=\Sigma(T(f_L^{(i)})*f_{rs}^{(i)}+(1-T(f_L^{(i)}))*f_{gs}^{(i)})$$

where i represents the number of rows.

The fusion formula of any row can be expressed as:

$$f_{res}=T(f_L)*f_{rs}+(1-T(f_L))*f_{gs}$$

where $f_{res}$ frequency domain fusion result of a row, $T(*)$ is a transformation function which can include a normalization function, $f_{rs}$ is a third frequency domain result, $f_{gs}$ is a second frequency domain result, and $f_L$ is a frequency domain gain coefficient of the corresponding row. The frequency domain fusion result of all rows can be combined according to the number of their own rows to obtain the target frequency domain image.

In the embodiment of the present disclosure, the frequency domain fusion formula is used to perform frequency domain fusion calculation on the frequency domain gain information, the third frequency result and the second frequency result, so as to achieve accurate fusion of the target frequency domain image and improve the fusion efficiency and accuracy of the target frequency domain image.

As an optional implementation, the extracting the second low frequency image of the second image and the third low frequency image of the first image includes:

obtaining a first projection image corresponding to the first image and a second projection image corresponding to the second image by projecting both the first image and the second image to a target coordinate system;

obtaining the third low frequency image of the first image based on low pass filtering processing of the first projection image;

obtaining the second low frequency image of the second image based on low pass filtering processing of the second projection image.

Optionally, the low pass filtering processing of the images involved in the present disclosure may refer to the calculation of the low pass filter with the images to obtain the corresponding low frequency images. The low pass filters may include Gaussian low pass filters, etc., and the specific types of low pass filters are not overly limited in the present disclosure.

In the embodiments of the present disclosure, in order to realize unified processing of the first image and the second image, both the first image and the second image can be projected to the target coordinate system to obtain the first projection image corresponding to the first image and the second projection image corresponding to the second image, so that the first image and the second image can be projected to the same coordinate system. Thus, after low pass filtering processing is performed on both the first projection image and the second projection image, the third low frequency image of the first image and the second low frequency image of the second image can be obtained, so as to achieve accurate extraction of low frequency information and ensure performing the unified processing on the first image and the second image in the same coordinate system.

In one possible design, the target coordinate system includes a pixel coordinate system of the first image, the obtaining the first projection image corresponding to the first image and the second projection image corresponding to the second image by projecting both the first image and the second image to the target coordinate system includes:

determining the first projection image of the first image in the pixel coordinate system;

obtaining a world image by projecting the second image to a world coordinate system;

obtaining a camera image by projecting the world image from the world coordinate system to a camera coordinate system of the first camera;

obtaining the second projection image by projecting the camera image from the camera coordinate system to the pixel coordinate system of the first image based on camera parameters of the first camera.

Camera parameters of the first camera can include camera internal parameters and distortion parameters of the first camera, which can be obtained through camera settings or parameter collection.

In the embodiment of the present disclosure, the pixel coordinate system of the first image can be determined as the target coordinate system, so that the second image is first projected to the world coordinate system, and then projected from the world coordinate system to the camera coordinate system. The camera image is projected to the pixel coordinate system through the camera parameters of the first camera, so as to obtain the second projection image and realize the effective projection of the first image.

In one possible design, the obtaining the third frequency result corresponding to the first image and the second frequency result corresponding to the second image by converting both the third low frequency image and the second low frequency image to the frequency domain includes:

obtaining the third frequency result corresponding to the first image by performing Fourier transform on the third low frequency image;

obtaining the second frequency result corresponding to the second image by performing Fourier transform on the second low frequency image.

In the embodiment of the present disclosure, the Fourier transform can be adopted to convert the third low frequency image and the second low frequency image in frequency domain, so as to obtain the third frequency result corresponding to the first image and the second frequency result corresponding to the second image, so as to realize the accurate conversion in frequency domain and improve the conversion efficiency and accuracy of the low frequency image.

Figure 3:
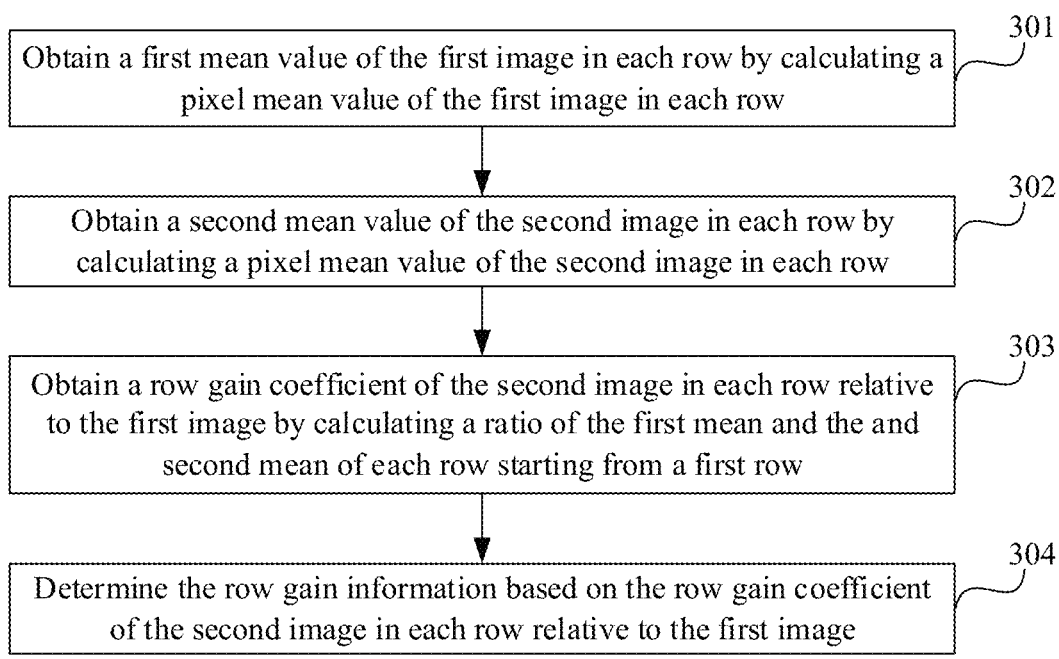
FIG. 3 is an image processing method in one or more embodiments of the present disclosure.

The embodiments shown in FIG. 3 and FIG. 4 all involve the acquisition of frequency domain gain information. In the above embodiments, the determining the frequency domain gain information based on the row gain coefficient of the second image in each row relative to the first image can include:

determining a ambient brightness vector formed by the row gain coefficients respectively corresponding to the first image in all rows according to the row gain coefficient of the second image in each row relative to the first image;

obtaining the frequency domain gain information by performing Fourier transform processing on the ambient brightness vector.

The ambient brightness vector can refer to the vector composed of the row gain coefficients respectively corresponding to the first image in all rows. Fourier transform is performing on the ambient brightness vector, that is, the ambient brightness vector is converted into the frequency domain, to obtain the corresponding frequency domain gain information. The frequency domain gain information can also include the gain coefficients corresponding to the first image in all rows.

In the embodiments of the present disclosure, the ambient brightness vector formed by the row gain coefficient of the first image in each row can be determined by using the row gain coefficient of the second image relative to the first image in each row. The frequency domain gain information can be obtained by performing Fourier transform on the ambient brightness vector. The ambient brightness vector can be converted from time domain to the frequency domain by the Fourier transform, and the frequency domain gain information is accurately and effectively extracted.

Figure 5:
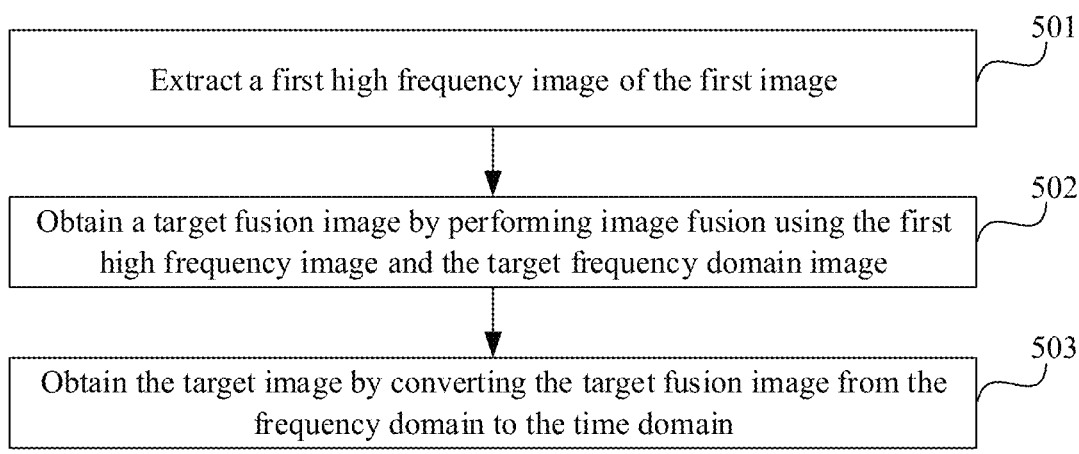
FIG. 5 is an image processing method in one or more embodiments of the present disclosure.

Referring to the embodiments shown in FIG. 3 and FIG. 4, when compensating images in the frequency domain, compensation is generally based on low frequency images. In order to ensure the clarity of images, high frequency compensation can be carried out on the target frequency domain image after obtaining the target frequency domain image. As shown in FIG. 5, which is an image processing method in one or more embodiments of the present disclosure, and the difference from the above embodiments lies in that obtaining the target image corresponding to the first image by converting the target frequency domain image from the frequency domain to the time domain, including:

501: extract a first high frequency image of the first image;

502: obtain a target fusion image by performing image fusion using the first high frequency image and the target frequency domain image;

503: obtain the target image by converting the target fusion image from the frequency domain to the time domain.

The obtaining the target image by converting the target fusion image from the frequency domain to the time domain can include: obtaining the target image by performing inverse Fourier transform on the target fusion image. The conversion from the frequency domain to the time domain can be completed by the inverse Fourier transform.

Optionally, a frequency of an image can be an indicator of the intensity of the change in the pixel value or the gray value of the image. The first high frequency image can be image high frequency noise in the first image, specifically, it can refer to the content that has drastic changes in the image. The first low frequency image can be the relatively stable content in the first image.

In the embodiment of the present disclosure, the first high frequency image of the first image can be extracted, and image fusion is performed on the first high frequency image and the target frequency domain image to obtain the target fusion image, the target fusion image is fused with the first high frequency image, to achieve the high frequency compensation for the target frequency domain image, the obtained target fusion image contains the high frequency and low frequency image information. After the time domain conversion, the clarity of the target image obtained is higher.

As an optional implementation, extracting the first high frequency image of the first image includes:

extracting a first low frequency image of the first image;

obtaining the first high frequency image by calculating an image difference between the first image and the first low frequency image.

The obtaining the first high frequency image by calculating the difference between the first image and the first low frequency image, which can include: for any coordinate point in the first image, the pixel difference between the pixel value of the coordinate point and the pixel value of the first low frequency image at that point is calculated, and the pixel difference of all coordinate points in the first image is obtained. The pixel difference of the first image at all coordinate points can constitute the first high frequency image.

In the embodiments of the present disclosure, the first high frequency image can be obtained by calculating the image difference between the first image and the first low frequency image, and the accurate extraction of the first high frequency image is realized.

Figure 6:
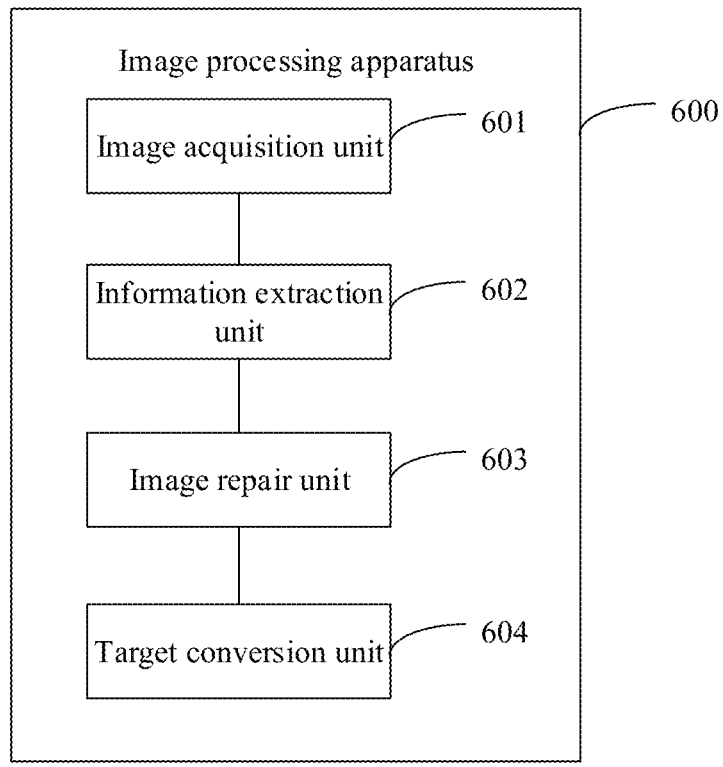
FIG. 6 is an image processing apparatus in one or more embodiments of the present disclosure.

As shown in FIG. 6, which is an image processing apparatus 600 in one or more embodiments of the present disclosure, the image processing apparatus can be used to perform an image processing method, can be located in a head-mounted device, and the image processing apparatus can include the following several units:

an image acquisition unit 601: configured to obtain a first image acquired by the first camera in the rolling shutter mode and a second image acquired by the second camera in the global shutter mode;

an information extraction unit 602: configured to obtain target gain information between the second image and the first image by performing image difference analysis on the first image and the second image;

an image repair unit 603: configured to obtain a target frequency domain image by using the target gain information to repair the first image in a frequency domain;

a target conversion unit 604: configured to obtain a target image corresponding to the first image by converting the target frequency domain image from the frequency domain to a time domain.

As an embodiment, the target gain information includes row gain information, and the information extraction unit 602 includes:

a first calculation module, configured to obtain a first mean value of the first image in each row by calculating a pixel mean value of the first image in each row;

a second calculation module, configured to obtain a second mean value of the second image in each row by calculating a pixel mean value of the second image in each row;

a first determination module, configured to obtain a row gain coefficient of the second image in each row relative to the first image by calculating a ratio of the first mean and the second mean of each row starting from a first row;

a second determination module, configured to determine the row gain information based on the row gain coefficient of the second image in each row relative to the first image.

As a possible implementation, the image repair unit 603 may include:

a first extraction module, configured to extract a first low frequency image of the first image;

a first conversion module, configured to obtain a first frequency result corresponding to the first image by converting the first low frequency image to the frequency domain;

a frequency domain gain module, configured to obtain the target frequency domain image by performing frequency domain gain processing on the first frequency result according to the row gain information.

In some embodiments, the frequency domain gain module includes:

a first determination submodule, configured to determine the row gain coefficient of the second image in each row relative to the first image;

a first calculation submodule, configured to calculate a multiplication result of frequency domain data of the first frequency domain result in a target row and the row gain coefficient corresponding to the target row, and take the multiplication result as target frequency domain data of the target row; where the target row is obtained by traversing from the first row to a last row of the first frequency domain result;

a first acquisition submodule, configured to obtain the target frequency domain image composed of the target frequency domain data corresponding to the first frequency result in all rows.

As an optional implementation, the first extraction module may include:

a first filter submodule, configured to obtain the first low frequency image of the first image based on low pass filtering processing of the first image.

As another embodiment, the target gain information includes: frequency domain gain information, and the information extraction unit 602 includes:

a power frequency detection module, configured to obtain power frequency acquired by the second camera by starting a stroboscopic detection function of the second camera;

a gain calculation module, configured to calculate a row gain coefficient of the second image in each row relative to the first image based on rolling shutter information of the first camera, the power frequency and exposure time of the first camera, combined with a gain calculation formula;

a second determination module, configured to determine the frequency domain gain information based on the row gain coefficient of the second image in each row relative to the first image.

In some embodiments, the image repair unit 603 includes:

a second extraction module, configured to extract a second low frequency image of the second image and a third low frequency image of the first image;

a second conversion module, configured to obtain a third frequency result corresponding to the first image and a second frequency result corresponding to the second image by converting both the third low frequency image and the second low frequency image to the frequency domain;

a frequency domain fusion module, configured to obtain the target frequency domain image by performing frequency domain fusion processing based on the frequency domain gain information, the third frequency result and the second frequency result.

In some embodiments, the frequency domain fusion module includes:

a fusion submodule, configured to obtain the target frequency domain image by performing frequency domain fusion calculation on the frequency domain gain information, the third frequency result and the second frequency result according to a frequency domain fusion formula.

As another embodiment, the second extraction module includes:

an image projection submodule, configured to obtain a first projection image corresponding to the first image and a second projection image corresponding to the second image by projecting both the first image and the second image to a target coordinate system;

a second filter submodule, configured to obtain the third low frequency image of the first image based on low pass filtering processing of the first projection image;

a third filter submodule, configured to obtain the second low frequency image of the second image based on low pass filtering processing of the second projection image.

In some embodiments, the target coordinate system includes a pixel coordinate system of the first image, and the image projection submodule can be specifically configured to:

determine the first projection image of the first image in the pixel coordinate system;

obtain a world image by projecting the second image to a world coordinate system;

obtain a camera image by projecting the world image from the world coordinate system to a camera coordinate system of the first camera;

obtain the second projection image by projecting the camera image from the camera coordinate system to the pixel coordinate system of the first image based on camera parameters of the first camera.

In some embodiments, the second conversion module includes:

a first transform submodule, configured to obtain the third frequency result corresponding to the first image by performing Fourier transform on the third low frequency image;

a second transform submodule, configured to obtain the second frequency result corresponding to the second image by performing Fourier transform on the second low frequency image.

In one possible design, the second determination module includes:

a vector determination submodule, configured to determine a ambient brightness vector formed by the row gain coefficients respectively corresponding to the first image in all rows according to the row gain coefficient of the second image in each row relative to the first image;

a third transform submodule, configured to obtain the frequency domain gain information by performing Fourier transform processing on the ambient brightness vector.

As another embodiment, the target conversion unit 604 includes:

a high frequency extraction module, configured to extract a first high frequency image of the first image;

a high frequency synthesis module, configured to obtain a target fusion image by performing image fusion using the first high frequency image and the target frequency domain image;

a time domain conversion module, configured to obtain the target image by converting the target fusion image from the frequency domain to the time domain.

In some embodiments, the high frequency extraction module can be configured to:

extract a first low frequency image of the first image;

obtain the first high frequency image by calculating an image difference between the first image and the first low frequency image.

The apparatus provided in this embodiment can be used to execute the technical scheme of the above method embodiments, and the implementation principles and the technical effects therebetween are similar, which will not be repeated in this embodiment.

In order to implement the above embodiments, a head-mounted device is also provided by one or more embodiments of the present disclosure.

Figure 7:
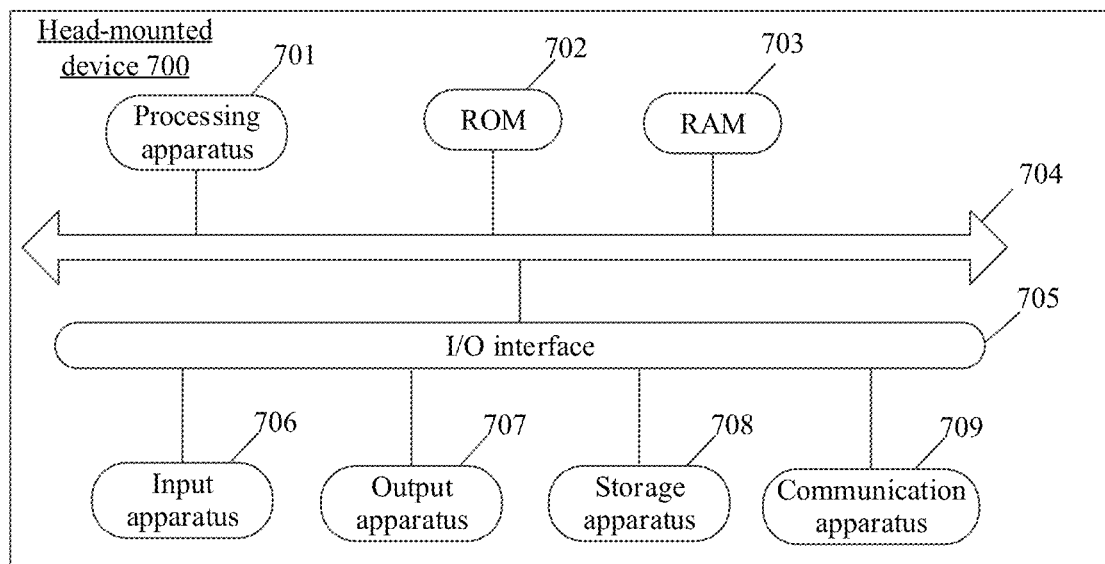
FIG. 7 is a schematic structural diagram of hardware of a head-mounted device in one or more embodiments of the present disclosure.

Refer to FIG. 7, which shows a schematic structural diagram of a head-mounted device 700 suitable for implementing one or more embodiments of the present disclosure, the head-mounted device 700 may be a terminal device or a server. The terminal device may include, but are not limited to, a mobile terminal such as a mobile phone, a laptop computer, a digital broadcast receiver, a personal digital assistant (Personal Digital Assistant, PDA for short), a portable android device (Portable Android device, PAD for short), a portable media player (Portable Media Player, PMP for short), an on-board terminal (such as an on-board navigation terminal) and a fixed terminal such as a digital TV, a desktop computer and so on. The head-mounted device shown in FIG. 7 is merely an example and should not impose any limitations on the function and the scope of use of the embodiments of the present disclosure.

As shown in FIG. 7, the head-mounted device 700 can include a processing apparatus (e.g. a central processing unit, a graphics processor, etc.) 701, which can perform various appropriate actions and processes depending on programs stored in a read only memory (Read Only Memory, ROM for short) 702 or programs loaded into a random access memory (Random Access Memory, RAM for short) 703 from a storage apparatus 708. RAM 703 also stores various programs and data required for the operation of the head-mounted device 700. The processing apparatus 701, the ROM 702, and the RAM 703 are connected to each other through a bus 704. An input/output (I/O) interface 705 is also connected to the bus 704.

Generally, the following apparatuses can be connected to the I/O interface 705: an input apparatus 706 such as a touch screen, a touchpad, a keyboard, a mouse, a camera, a microphone, an accelerometer, a gyroscope, etc.; an output apparatus 707 such as a liquid crystal display (Liquid Crystal Display, LCD for short), a loudspeaker, a vibrator, etc.; a storage apparatus 708 such as a magnetic tape, a hard disk, etc.; and a communication apparatus 709. The communication apparatus 709 may allow the head-mounted device 700 to exchange data with other devices through wireless or wired communication. Although FIG. 7 shows a head-mounted device 700 with various apparatuses, it should be understood that it is not required to implement or have all of the apparatuses shown. More or fewer apparatuses may alternatively be implemented or provided.

In particular, the process described above with reference to the flow diagrams may be implemented as a computer software program in accordance with an embodiment of the present disclosure. For example, an embodiment of the present disclosure includes a computer program product that includes a computer program carried on a computer readable medium, the computer program contains a program code for performing the method shown in the flow diagram. In such an embodiment, the computer program can be downloaded and installed from the network via the communication apparatus 709, or be installed from the storage apparatus 708 or the ROM 702. When the computer program is executed by the processing apparatus 701, the above functions defined in the method of the embodiment of the present disclosure are performed.

It should be noted that the above computer readable medium in the present disclosure may be a computer readable signal medium or a computer readable storage medium or a combination of the two. The computer readable storage medium, for example, may be, but are not limited to, electrical, magnetic, optical, electromagnetic, infrared, or semiconductor systems, apparatuses or devices, or any combination of the above. More specific examples of the computer readable storage medium may include, but are not limited to: electrical connection with one or more wires, a portable computer disk, a hard disk, a random access memory (RAM), a read only memory (ROM), an erasable programmable read only memory (EPROM or a flash memory), a fiber optic, a portable compact disk read only memory (CD-ROM), an optical storage device, a magnetic storage device, or any suitable combination of the foregoing. In the present disclosure, a computer readable storage medium may be any tangible medium containing or storing a program, and the program may be used by or in combination with an instruction execution system, apparatus or device. In the present disclosure, a computer readable signal medium may include a data signal propagated in baseband or as part of a carrier that carries a computer readable program code. Such transmitted data signals may take many forms, including but not limited to electromagnetic signals, optical signals, or any suitable combination of the above. The computer readable signal medium may also be any computer readable medium other than the computer readable storage medium, which may send, propagate or transmit a program used by or in combination with an instruction execution system, apparatus or device. The program code contained on the computer readable medium may be transmitted in any appropriate medium, including but not limited to: a wire, an optical cable, RF (Radio Frequency), etc., or any suitable combination of the above.

The computer readable medium may be included in the head-mounted device; or it may exist alone and not be incorporated into the head-mounted device.

The computer readable medium carries one or more programs which, when executed by the head-mounted device, enables the head-mounted device to perform the method shown in the above embodiment.

The computer program code used to perform operations of the present disclosure can be written in one or more programming languages or combinations of them, the programming languages include object-oriented programming languages such as Java, Smalltalk, C++, as well as regular procedural programming languages such as the "C" language or similar programming languages. The program code may execute completely on the user's computer, partly on the user's computer, as a stand-alone package, partly on the user's computer and partly on a remote computer, or completely on a remote computer or a server. In the case of a remote computer, the remote computer may connect to the user's computer through any kind of Network, including a local area network (Local Area Network, LAN for short) or a wide area network (Wide Area Network, WAN for short), or, connect to an external computer (for example, using an Internet service provider to connect through the Internet).

The flow diagrams and block diagrams in the drawings illustrate the possible realization of architecture, functions and operations of the systems, the methods and the computer program products in accordance with the various embodiments of the present disclosure. At this point, each block in a flow diagram or a block diagram may represent a module, a program segment, or part of the code that contains one or more executable instructions to implement a specified logical function. It should also be noted that in some alternative implementations, the functions labeled in the block can also occur in a different order than those labeled in the drawings. For example, two blocks represented back-to-back can actually be executed mostly in parallel, and they can sometimes be executed in a reverse order, depending on the functionality involved. Note also that each block in the block diagram and/or the flow diagram, and the combination of blocks in the block diagram and/or the flow diagram, can be implemented either with a dedicated hardware-based system that performs a specified function or operation, or with a combination of dedicated hardware and computer instructions.

The units described in an embodiment of the present disclosure may be implemented by means of software or hardware. In some cases, a name of the unit does not qualify the unit itself. For example, the first acquisition unit can also be described as "the unit that acquires at least two Internet protocol addresses".

The functions described above herein can be performed at least in part by one or more hardware logical parts. For example, unrestrictedly, demonstration types of hardware logic parts that can be used include: a field-programmable gate array (FPGA), an application specific integrated circuit (ASIC), an application specific standard product (ASSP), a system on chip (SOC), a complex programmable logic device (CPLD) and so on.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable storage medium may include, but is not limited to an electrical, a magnetic, an optical, an electromagnetic, an infrared, or a semiconductor system, apparatus, or device, or any suitable combination of the foregoing. More specific examples of the machine readable storage medium may include an electrical connection with one or more wires, a portable computer disk, a hard disk, a random access memory (RAM), a read-only memory (ROM), an erasable programmable read only memory (EPROM or a flash memory), a fiber optic, a portable compact disk read-only memory (CD-ROM), an optical storage device, a magnetic storage device, or any suitable combination of the foregoing.

In a first aspect, an image processing method for a head-mounted device is provided according to one or more embodiments of the present disclosure, where the head-mounted device includes a first camera set to be in a rolling shutter mode and a second camera set to be in a global shutter mode, and the method includes:

obtaining a first image acquired by the first camera and a second image acquired by the second camera;

obtaining target gain information between the second image and the first image by performing image difference analysis on the first image and the second image;

obtaining a target frequency domain image by using the target gain information to repair the first image in a frequency domain;

obtaining a target image corresponding to the first image by converting the target frequency domain image from the frequency domain to a time domain.

According to one or more embodiments of the present disclosure, the target gain information includes: row gain information. The obtaining the target gain information between the second image and the first image by performing the image difference analysis on the first image and the second image includes:

obtaining a first mean value of the first image in each row by calculating a pixel mean value of the first image in each row;

obtaining a second mean value of the second image in each row by calculating a pixel mean value of the second image in each row;

obtaining a row gain coefficient of the second image in each row relative to the first image by calculating a ratio of the first mean and the second mean of each row starting from a first row;

determining the row gain information based on the row gain coefficient of the second image in each row relative to the first image.

According to one or more embodiments of the present disclosure, the obtaining the target frequency domain image by using the target gain information to repair the first image in the frequency domain includes:

extracting a first low frequency image of the first image;

obtaining a first frequency result corresponding to the first image by converting the first low frequency image to the frequency domain;

obtaining the target frequency domain image by performing frequency domain gain processing on the first frequency result according to the row gain information.

According to one or more embodiments of the present disclosure, the obtaining the target frequency domain image by performing the frequency domain gain processing on the first frequency result according to the row gain information includes:

determining the row gain coefficient of the second image in each row relative to the first image;

calculating a multiplication result of frequency domain data of the first frequency domain result in a target row and the row gain coefficient corresponding to the target row, and taking the multiplication result as target frequency domain data of the target row; where the target row is obtained by traversing from the first row to a last row of the first frequency domain result;

obtaining the target frequency domain image composed of the target frequency domain data corresponding to the first frequency result in all rows.

According to one or more embodiments of the present disclosure, the extracting the first low frequency image of the first image includes:

obtaining the first low frequency image of the first image based on the low pass filtering processing of the first image.

According to one or more embodiments of the present disclosure, the target gain information includes: frequency domain gain information, and the obtaining the target gain information between the second image and the first image by performing the image difference analysis on the first image and the second image includes:

obtaining power frequency acquired by the second camera by starting a stroboscopic detection function of the second camera;

calculating a row gain coefficient of the second image in each row relative to the first image based on rolling shutter information of the first camera, the power frequency and exposure time of the first camera, combined with a gain calculation formula;

determining the frequency domain gain information based on the row gain coefficient of the second image in each row relative to the first image.

According to one or more embodiments of the present disclosure, obtaining the target frequency domain image by using the target gain information to repair the first image in the frequency domain includes:

extracting a second low frequency image of the second image and a third low frequency image of the first image;

obtaining a third frequency result corresponding to the first image and a second frequency result corresponding to the second image by converting both the third low frequency image and the second low frequency image to the frequency domain;

obtaining the target frequency domain image by performing frequency domain fusion processing based on the frequency domain gain information, the third frequency result and the second frequency result.

According to one or more embodiments of the present disclosure, the obtaining the target frequency domain image by performing the frequency domain fusion processing based on the frequency domain gain information, the third frequency result and the second frequency result includes:

obtaining the target frequency domain image by performing frequency domain fusion calculation on the frequency domain gain information, the third frequency result and the second frequency result according to a frequency domain fusion formula.

According to one or more embodiments of the present disclosure, the extracting the second low frequency image of the second image and the third low frequency image of the first image includes:

obtaining a first projection image corresponding to the first image and a second projection image corresponding to the second image by projecting both the first image and the second image to a target coordinate system;

obtaining the third low frequency image of the first image based on low pass filtering processing of the first projection image;

obtaining the second low frequency image of the second image based on low pass filtering processing of the second projection image.

According to one or more embodiments of the present disclosure, the target coordinate system includes a pixel coordinate system of the first image, and the obtaining the first projection image corresponding to the first image and the second projection image corresponding to the second image by projecting both the first image and the second image to the target coordinate system includes:

determining the first projection image of the first image in the pixel coordinate system;

obtaining a world image by projecting the second image to a world coordinate system;

obtaining a camera image by projecting the world image from the world coordinate system to a camera coordinate system of the first camera;

obtaining the second projection image by projecting the camera image from the camera coordinate system to the pixel coordinate system of the first image based on the camera parameters of first camera.

According to one or more embodiments of the present disclosure, the obtaining the third frequency result corresponding to the first image and the second frequency result corresponding to the second image by converting both the third low frequency image and the second low frequency image to the frequency domain includes:

obtaining the third frequency result corresponding to the first image by performing Fourier transform on the third low frequency image;

obtaining the second frequency result corresponding to the second image by performing Fourier transform on the second low frequency image.

According to one or more embodiments of the present disclosure, the determining the frequency domain gain information based on the row gain coefficient of the second image in each row relative to the first image includes:

determining a ambient brightness vector formed by the row gain coefficients respectively corresponding to the first image in all rows according to the row gain coefficient of the second image in each row relative to the first image;

obtaining the frequency domain gain information by performing Fourier transform processing on the ambient brightness vector.

According to one or more embodiments of the present disclosure, the obtaining the target image corresponding to the first image by converting the target frequency domain image from the frequency domain to the time domain includes:

extracting a first high frequency image of the first image;

obtaining a target fusion image by performing image fusion using the first high frequency image and the target frequency domain image;

obtaining the target image by converting the target fusion image from the frequency domain to the time domain.

According to one or more embodiments of the present disclosure, the extracting the first high frequency image of the first image includes:

extracting a first low frequency image of the first image;

obtaining the first high frequency image by calculating an image difference between the first image and the first low frequency image.

In the second aspect, according to one or more embodiments of the present disclosure, an image processing apparatus located in a head-mounted device is provided, where the head-mounted device includes a first camera set to be in a rolling shutter mode and a second camera set to be in a global shutter mode, and the apparatus includes:

an image acquisition unit, configured to obtain a first image acquired by the first camera in the rolling shutter mode and a second image acquired by the second camera in the global shutter mode;

an information extraction unit, configured to obtain target gain information between the second image and the first image by performing image difference analysis on the first image and the second image;

an image repair unit, configured to obtain a target frequency domain image by using the target gain information to repair the first image in a frequency domain;

a target conversion unit, configured to obtain a target image corresponding to the first image by converting the target frequency domain image from the frequency domain to a time domain.

In the third aspect, according to one or more embodiments of the present disclosure, a head-mounted device is provided, including: at least one processor and a memory;

the memory stores computer-executed instructions;

the at least one processor executes the computer-executed instructions stored in the memory to enable the at least one processor to execute the image processing method described above in the first aspect and in various possible designs of the first aspect.

In the fourth aspect, according to one or more embodiments of the present disclosure, a computer readable storage medium is provided, in which computer-executed instructions are stored, and when the processor executes the computer-executed instructions, the image processing method described above in the first aspect and in various possible designs of the first aspect is implemented.

In the fifth aspect, according to one or more embodiments of the present disclosure, a computer program product is provided, including a computer program which, when executed by a processor, implements the image processing method described above in the first aspect and in various possible designs of the first aspect.

The above description is only a better embodiment of the present disclosure and an explanation of the technical principles used. The person skilled in the art shall understand that the scope of disclosure covered by the present disclosure shall not be limited to technical schemes formed by a particular combination of the above technical features, but shall also cover other technical schemes formed by any combination of the above technical features or their equivalent without departing from the above disclosed concept, for example, a technical scheme formed by substituting the above features with the similar functional technical features disclosed in, but not limited to, the present disclosure.

Furthermore, although operations are described in a particular order, this should not be understood as requiring that they be performed in the particular order indicated or in a sequential order. In certain circumstances, multitasking and parallel processing can be beneficial. Similarly, although a number of concrete implementation details are included in the above discussion, these should not be interpreted as limiting the scope of the present disclosure. Some of the features described in the context of a single embodiment can also be realized in combination in a single embodiment. Conversely, various features described in the context of a single embodiment can also be realized in multiple embodiments individually or in any suitable sub-combination.

Although the subject has been described in languages specific to structural features and/or methodological logical actions, it should be understood that the subject defined in the claims is not necessarily limited to the specific features or actions described above. Rather, the specific features and actions described above are merely exemplary forms for implementing the claims.

What is claimed is:

1. An image processing method, applied to a head-mounted device, wherein the head-mounted device comprises a first camera set to be in a rolling shutter mode and a second camera set to be in a global shutter mode, and the method comprises:

obtaining a first image acquired by the first camera and a second image acquired by the second camera;

obtaining target gain information between the second image and the first image by performing image difference analysis on the first image and the second image;

obtaining a target frequency domain image by using the target gain information to repair the first image in a frequency domain;

obtaining a target image corresponding to the first image by converting the target frequency domain image from the frequency domain to a time domain.

2. The method according to claim 1, wherein the target gain information comprises: row gain information, and the obtaining the target gain information between the second image and the first image by performing the image difference analysis on the first image and the second image comprises:

obtaining a first mean value of the first image in each row by calculating a pixel mean value of the first image in each row;

obtaining a second mean value of the second image in each row by calculating a pixel mean value of the second image in each row;

obtaining a row gain coefficient of the second image in each row relative to the first image by calculating a ratio of the first mean and the second mean of each row starting from a first row;

determining the row gain information based on the row gain coefficient of the second image in each row relative to the first image.

3. The method according to claim 2, wherein the obtaining the target frequency domain image by using the target gain information to repair the first image in the frequency domain comprises:
extracting a first low frequency image of the first image;
obtaining a first frequency result corresponding to the first image by converting the first low frequency image to the frequency domain;
obtaining the target frequency domain image by performing frequency domain gain processing on the first frequency result according to the row gain information.

4. The method according to claim 3, wherein the obtaining the target frequency domain image by performing the frequency domain gain processing on the first frequency result according to the row gain information comprises:
determining the row gain coefficient of the second image in each row relative to the first image;
calculating a multiplication result of frequency domain data of the first frequency domain result in a target row and the row gain coefficient corresponding to the target row, and taking the multiplication result as target frequency domain data of the target row; wherein the target row is obtained by traversing from the first row to a last row of the first frequency domain result;
obtaining the target frequency domain image composed of the target frequency domain data corresponding to the first frequency result in all rows.

5. The method according to claim 4, wherein the extracting the first low frequency image of the first image comprises:
obtaining the first low frequency image of the first image based on low pass filtering processing of the first image.

6. The method according to claim 1, wherein the target gain information comprises: frequency domain gain information, and the obtaining the target gain information between the second image and the first image by performing the image difference analysis on the first image and the second image comprises:
obtaining power frequency acquired by the second camera by starting a stroboscopic detection function of the second camera;
calculating a row gain coefficient of the second image in each row relative to the first image based on rolling shutter information of the first camera, the power frequency and exposure time of the first camera, combined with a gain calculation formula;
determining the frequency domain gain information based on the row gain coefficient of the second image in each row relative to the first image.

7. The method according to claim 6, wherein the obtaining the target frequency domain image by using the target gain information to repair the first image in the frequency domain comprises:
extracting a second low frequency image of the second image and a third low frequency image of the first image;
obtaining a third frequency result corresponding to the first image and a second frequency result corresponding to the second image by converting both the third low frequency image and the second low frequency image to the frequency domain;
obtaining the target frequency domain image by performing frequency domain fusion processing based on the frequency domain gain information, the third frequency result and the second frequency result.

8. The method according to claim 7, wherein the obtaining the target frequency domain image by performing the frequency domain fusion processing based on the frequency domain gain information, the third frequency result and the second frequency result comprises:
obtaining the target frequency domain image by performing frequency domain fusion calculation on the frequency domain gain information, the third frequency result and the second frequency result according to a frequency domain fusion formula.

9. The method according to claim 7, wherein the extracting the second low frequency image of the second image and the third low frequency image of the first image comprises:
obtaining a first projection image corresponding to the first image and a second projection image corresponding to the second image by projecting both the first image and the second image to a target coordinate system;
obtaining the third low frequency image of the first image based on low pass filtering processing of the first projection image;
obtaining the second low frequency image of the second image based on low pass filtering processing of the second projection image.

10. The method according to claim 9, wherein the target coordinate system includes a pixel coordinate system of the first image, and the obtaining the first projection image corresponding to the first image and the second projection image corresponding to the second image by projecting both the first image and the second image to the target coordinate system comprises:
determining the first projection image of the first image in the pixel coordinate system;
obtaining a world image by projecting the second image to a world coordinate system;
obtaining a camera image by projecting the world image from the world coordinate system to a camera coordinate system of the first camera;
obtaining the second projection image by projecting the camera image from the camera coordinate system to the pixel coordinate system of the first image based on camera parameters of the first camera.

11. The method according to claim 7, wherein the obtaining the third frequency result corresponding to the first image and the second frequency result corresponding to the second image by converting both the third low frequency image and the second low frequency image to the frequency domain comprises:
obtaining the third frequency result corresponding to the first image by performing Fourier transform on the third low frequency image;
obtaining the second frequency result corresponding to the second image by performing Fourier transform on the second low frequency image.

12. The method according to claim 6, wherein the determining the frequency domain gain information based on the row gain coefficient of the second image in each row relative to the first image comprises:
determining a ambient brightness vector formed by the row gain coefficients respectively corresponding to the first image in all rows according to the row gain coefficient of the second image in each row relative to the first image;

obtaining the frequency domain gain information by performing Fourier transform processing on the ambient brightness vector.

13. The method according to claim 1, wherein the obtaining the target image corresponding to the first image by converting the target frequency domain image from the frequency domain to the time domain comprises:

extracting a first high frequency image of the first image;

obtaining a target fusion image by performing image fusion using the first high frequency image and the target frequency domain image;

obtaining the target image by converting the target fusion image from the frequency domain to the time domain.

14. The method according to claim 13, wherein the extracting the first high frequency image of the first image comprises:

extracting a first low frequency image of the first image;

obtaining the first high frequency image by calculating an image difference between the first image and the first low frequency image.

15. An image processing apparatus, located in a head-mounted device, wherein the head-mounted device comprises a processor, a memory, a first camera set to be in a rolling shutter mode and a second camera set to be in a global shutter mode;

wherein the memory stores computer-executed instructions;

the processor executes the computer-executed instructions stored in the memory to enable the processor to:

obtain a first image acquired by the first camera in the rolling shutter mode and a second image acquired by the second camera in the global shutter mode;

obtain target gain information between the second image and the first image by performing image difference analysis on the first image and the second image;

obtain a target frequency domain image by using the target gain information to repair the first image in a frequency domain;

obtain a target image corresponding to the first image by converting the target frequency domain image from the frequency domain to a time domain.

16. The image processing apparatus according to claim 15, wherein the target gain information comprises: row gain information, and the processor executes the computer-executed instructions stored in the memory to further enable the processor to:

obtain a first mean value of the first image in each row by calculating a pixel mean value of the first image in each row;

obtain a second mean value of the second image in each row by calculating a pixel mean value of the second image in each row;

obtain a row gain coefficient of the second image in each row relative to the first image by calculating a ratio of the first mean and the second mean of each row starting from a first row;

determine the row gain information based on the row gain coefficient of the second image in each row relative to the first image.

17. The image processing apparatus according to claim 16, the processor executes the computer-executed instructions stored in the memory to further enable the processor to:

extract a first low frequency image of the first image;

obtain a first frequency result corresponding to the first image by converting the first low frequency image to the frequency domain;

obtain the target frequency domain image by performing frequency domain gain processing on the first frequency result according to the row gain information.

18. The image processing apparatus according to claim 17, the processor executes the computer-executed instructions stored in the memory to further enable the processor to:

determine the row gain coefficient of the second image in each row relative to the first image;

calculate a multiplication result of frequency domain data of the first frequency domain result in a target row and the row gain coefficient corresponding to the target row, and take the multiplication result as target frequency domain data of the target row; wherein the target row is obtained by traversing from the first row to a last row of the first frequency domain result;

obtain the target frequency domain image composed of the target frequency domain data corresponding to the first frequency result in all rows.

19. The image processing apparatus according to claim 18, the processor executes the computer-executed instructions stored in the memory to further enable the processor to:

obtain the first low frequency image of the first image based on low pass filtering processing of the first image.

20. A non-transitory computer readable storage medium, wherein the computer readable memory medium stores computer-executed instructions, the computer-executed instructions are executed by a processor to enable the processor to:

obtain a first image acquired by a first camera in a rolling shutter mode and a second image acquired by a second camera in a global shutter mode;

obtain target gain information between the second image and the first image by performing image difference analysis on the first image and the second image;

obtain a target frequency domain image by using the target gain information to repair the first image in a frequency domain;

obtain a target image corresponding to the first image by converting the target frequency domain image from the frequency domain to a time domain.

* * * * *